United States Patent
Kim et al.

(10) Patent No.: US 10,181,926 B2
(45) Date of Patent: Jan. 15, 2019

(54) ELECTRONIC DEVICE AND METHOD FOR OPERATING THE SAME

(71) Applicant: SAMSUNG ELECTRONICS CO., LTD., Suwon-si, Gyeonggi-do (KR)

(72) Inventors: Inho Kim, Suwon-si (KR); Jongkeun Song, Yongin-si (KR); Woosup Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/819,484

(22) Filed: Nov. 21, 2017

(65) Prior Publication Data

US 2018/0175966 A1 Jun. 21, 2018

(30) Foreign Application Priority Data

Nov. 22, 2016 (KR) .................. 10-2016-0155510

(51) Int. Cl.
*H04K 3/00* (2006.01)
*G06Q 20/32* (2012.01)
(Continued)

(52) U.S. Cl.
CPC ............ *H04K 3/825* (2013.01); *G06K 19/06* (2013.01); *G06K 19/06206* (2013.01);
(Continued)

(58) Field of Classification Search
CPC ............ G06K 19/06; G06K 19/06206; G06Q 20/325; H04K 3/825; H04K 3/827; H04M 1/026
(Continued)

(56) References Cited

U.S. PATENT DOCUMENTS 6,529,170 B1 * 3/2003 Nishizawa ............... H01Q 1/38
   343/700 MS
8,814,046 B1 * 8/2014 Wallner .................. G06K 7/08
   235/449

(Continued)

FOREIGN PATENT DOCUMENTS

EP   3 048 666       7/2016
KR   10-1283623      7/2013
KR   10-2014-0030033 3/2014

OTHER PUBLICATIONS

Search Report dated Feb. 28, 2018 in counterpart International Patent Application No. PCT/KR2017/013265.

(Continued)

*Primary Examiner* — Tan H Trinh
(74) *Attorney, Agent, or Firm* — Nixon & Vanderhye, P.C.

(57) ABSTRACT

An electronic device includes first and second antennas, a magnetic stripe transmission (MST) integrated circuit (IC), and a processor. The first antenna is disposed between first and second surfaces of the electronic device and in parallel with the first and second surfaces of the electronic device. The first antenna outputs a signal in a first direction. The second antenna is disposed between the second surface of the electronic device and the first antenna and in parallel with the first and second surfaces of the electronic device. The second antenna outputs a signal in a second direction. The MST IC controls the first and second antennas. When a payment mode is executed, the processor controls the MST IC such that one of the first and second antennas outputs an MST signal and the other of the first and second antenna outputs a jamming signal for interfering with wiretapping of the MST signal.

20 Claims, 10 Drawing Sheets

(51) Int. Cl.
*G06K 19/06* (2006.01)
*G06K 19/073* (2006.01)
*H04M 1/02* (2006.01)

(52) U.S. Cl.
CPC ..... *G06K 19/07336* (2013.01); *G06Q 20/325* (2013.01); *H04K 3/827* (2013.01); *H04M 1/026* (2013.01)

(58) Field of Classification Search
USPC ............ 455/41.1, 41.2, 41.3, 63.4, 1, 67.11, 455/67.13, 67.16, 575.5, 575.7, 115.1, 455/114.2, 121; 343/787, 853, 700, 702, 343/893; 235/449; 705/39
See application file for complete search history.

(56) References Cited

U.S. PATENT DOCUMENTS

| | | | | |
|---|---|---|---|---|
| 8,896,488 | B2* | 11/2014 | Ayala Vazquez | H01Q 1/243 343/702 |
| 9,449,192 | B1 | 9/2016 | Wade et al. | |
| 9,449,265 | B1 | 9/2016 | Maguire et al. | |
| 2005/0176374 | A1* | 8/2005 | Fang | H04B 7/0691 455/63.4 |
| 2008/0126260 | A1 | 6/2008 | Cox et al. | |
| 2009/0081943 | A1 | 3/2009 | Dobyns et al. | |
| 2010/0045535 | A1* | 2/2010 | Lin | H01Q 1/38 343/700 MS |
| 2011/0006112 | A1 | 1/2011 | Mueller | |
| 2011/0156963 | A1* | 6/2011 | Rajgopal | H01P 1/203 343/702 |
| 2011/0165915 | A1* | 7/2011 | Kim | H01Q 1/2266 455/566 |
| 2012/0274536 | A1* | 11/2012 | Pan | H01Q 1/38 343/853 |
| 2013/0130614 | A1* | 5/2013 | Busch-Sorensen | H04K 3/86 455/1 |
| 2013/0141305 | A1* | 6/2013 | Leem | H01Q 21/28 343/893 |
| 2014/0118116 | A1 | 5/2014 | Lavedas | |
| 2014/0368394 | A1* | 12/2014 | Pagani | H01L 23/48 343/787 |
| 2015/0244062 | A1* | 8/2015 | Chou | H01Q 1/243 455/41.1 |
| 2016/0210615 | A1* | 7/2016 | Lee | G06Q 20/3278 |
| 2016/0210616 | A1 | 7/2016 | Lee et al. | |
| 2016/0240915 | A1* | 8/2016 | Nam | B29C 45/14639 |
| 2016/0247144 | A1* | 8/2016 | Oh | G06Q 20/3278 |
| 2016/0253651 | A1* | 9/2016 | Park | G06F 3/0482 705/39 |
| 2016/0268686 | A1* | 9/2016 | Ryu | H01Q 21/24 |
| 2016/0292669 | A1* | 10/2016 | Tunnell | G06Q 20/3278 |
| 2016/0329635 | A1* | 11/2016 | Tsutsumi | H01Q 1/526 |
| 2016/0371691 | A1* | 12/2016 | Kang | G06F 3/04842 |
| 2017/0017938 | A1* | 1/2017 | Lee | G06K 19/07773 |
| 2017/0033451 | A1* | 2/2017 | Lim | H04B 5/0031 |
| 2017/0070909 | A1* | 3/2017 | Kim | H04W 76/28 |
| 2018/0083728 | A1* | 3/2018 | Yu | H04K 3/60 |
| 2018/0123224 | A1* | 5/2018 | Jung | H01Q 1/273 |
| 2018/0205132 | A1* | 7/2018 | Lee | H01Q 1/22 |

OTHER PUBLICATIONS

Search Report dated Sep. 3, 2018 in counterpart European Patent Application No. 17203137.9.

* cited by examiner

ELECTRONIC DEVICE AND METHOD FOR OPERATING THE SAME

CROSS-REFERENCE TO RELATED APPLICATION

This application is based on and claims priority under 35 U.S.C. § 119 to a Korean patent application filed on Nov. 22, 2016 in the Korean Intellectual Property Office and assigned Serial number 10-2016-0155510, the disclosure of which is incorporated by reference herein in its entirety.

TECHNICAL FIELD

The present disclosure relates generally to an electronic device and an operating method thereof, and for example to a technique for preventing and/or reducing wiretapping of a signal output by the electronic device.

BACKGROUND

With the popularization of a great variety of electronic devices such as a smart phone, a tablet personal computer (tablet PC), a portable multimedia player (PMP), a personal digital assistant (PDA), a laptop PC, and a wearable device, there is an increasing interest in developing a technique for a simple payment method using such electronic devices.

In response to this growing interest in a simple payment method, various techniques for a simple payment method are being developed. One of such techniques is for a simple payment method based on recognition of a bar code output on a display of the electronic device.

Another technique is a simple payment method using communication with a payment terminal (often referred to as a point of sale (POS)) through a short-range communication module included in the electronic device.

Still another technique for a simple payment method is to use what is called a magnetic stripe transmission (MST) signal. Typically, the MST signal is a magnetic field signal usually generated by passing (e.g., swiping) a payment card (e.g., a credit card, a debit card, a check card, etc.) through the payment terminal. According to this technique for a simple payment method, the electronic device itself outputs the MST signal such that the payment terminal can recognize the output magnetic field.

In case of the latter technique, because the electronic device outputs the MST signal that is the same as the magnetic field signal generated when the payment card is passed through the payment terminal, it is available for use with an existing payment terminal without the need for any additional device. For this reason, this technique is becoming widespread.

However, a problem with this simple payment technique that outputs the magnetic field signal is that a malicious third party may possibly acquire the magnetic field signal transmitted to the payment terminal. In this case, a certain malicious third party may perform payment using the acquired magnetic field signal within a validity period.

SUMMARY

Various example embodiments of the present disclosure address prevention and/or reduction of a malicious third party performing wiretapping or interception of a magnetic stripe transmission (MST) signal used for a simple payment method.

According to various example embodiments of the present disclosure, an electronic device may comprise a first antenna disposed between first and second surfaces of the electronic device and in parallel with the first and second surfaces of the electronic device, the first antenna configured to output a signal in a first direction; a second antenna disposed between the second surface of the electronic device and the first antenna and in parallel with the first and second surfaces of the electronic device, the second antenna configured to output a signal in a second direction; a magnetic stripe transmission (MST) integrated circuit (IC) configured to control the first and second antennas; and a processor configured to control, when a payment mode is executed, the MST IC such that one of the first and second antennas outputs an MST signal and the other antenna outputs a jamming signal interfering with wiretapping of the MST signal.

According to various example embodiments of the present disclosure, an electronic device may comprise a first antenna disposed between first and second surfaces of the electronic device and in parallel with the first and second surfaces of the electronic device, the first antenna configured to output a signal in a first direction; a second antenna disposed between the second surface of the electronic device and the first antenna and in parallel with the first and second surfaces of the electronic device, the second antenna configured to output a signal in a second direction; a magnetic stripe transmission (MST) integrated circuit (IC) configured to control the first and second antennas; and a processor configured to control the MST IC, wherein the processor is configured to, when a payment mode is executed, determine whether to output an MST signal, based on a motion of the electronic device, to determine an antenna for outputting the MST signal and another antenna for outputting a jamming signal for interfering with wiretapping of the MST signal from among the first and second antennas based on a posture of the electronic device, and to control the MST IC to output the jamming signal in response to an output of the MST signal.

According to various example embodiments of the present disclosure, a method of operating an electronic device may comprise determining whether a payment mode is executed; determining an antenna for outputting a magnetic stripe transmission (MST) signal and another antenna for outputting a jamming signal for interfering with wiretapping of the MST signal from among first and second antennas when the payment mode is executed, wherein the first antenna is disposed between first and second surfaces of the electronic device and in parallel with the first and second surfaces of the electronic device, the first antenna configured to output a signal in a first direction, and wherein a second antenna is disposed between the second surface of the electronic device and the first antenna and in parallel with the first and second surfaces of the electronic device, the second antenna configured to output a signal in a second direction; and outputting the MST signal and the jamming signal by controlling the determined antennas.

According to various example embodiments of the present disclosure, the electronic device may simultaneously output the MST signal and the jamming signal for interfering with the wiretapping of the MST signal. Because the jamming signal obstructs a malicious third party from wiretapping the MST signal, the security of payment using the electronic device can be enhanced (e.g., improved).

In addition, the electronic device may measure (determine) a proximity to the payment terminal (e.g., POS) and, based on the proximity, determine whether to output the MST signal. Therefore, the electronic device may output the MST signal only when being located near (within a predetermined distance of) the payment terminal. This may reduce a time for a malicious third party to wiretap the MST signal, thereby further enhancing the security of payment.

Further, the electronic device may determine whether to output the MST signal depending on whether the payment terminal is connected by short-range wireless communication. Therefore, the electronic device may output the MST signal only when it is located near the payment terminal. This may reduce a time for a malicious third party to wiretap the MST signal, thereby further enhancing the security of payment.

Also, the electronic device may output the MST signal using an antenna closer to the payment terminal, based on a posture thereof. Therefore, a malicious third party may have further difficulty in wiretapping the MST signal.

BRIEF DESCRIPTION OF THE DRAWINGS

The above and/or other aspects, features and attendant advantages of the present disclosure may be more apparent and readily appreciated from the following detailed description, taken in conjunction with the accompanying drawings, in which like reference numerals refer to like elements, and wherein.

DETAILED DESCRIPTION

Figure 1:
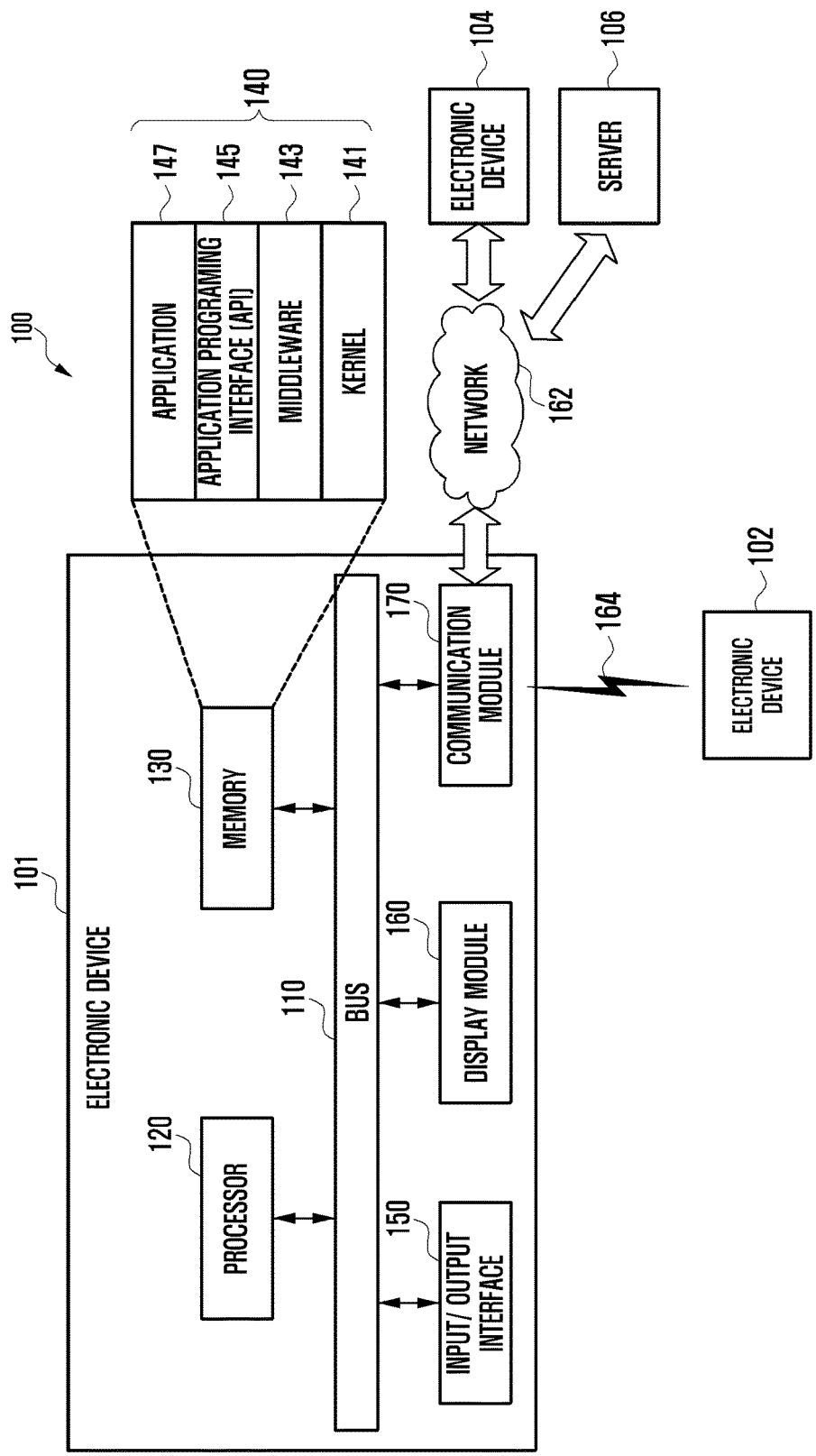
FIG. 1 is a diagram illustrating an example network environment including an example electronic device according to various example embodiments of the present disclosure.

The following description is made with reference to the accompanying drawings and is provided to aid in understanding the various example embodiments of the present disclosure. The disclosure includes various specific details to assist in that understanding but these are to be regarded as merely examples. Accordingly, those of ordinary skill in the art will recognize that various changes and modifications of the various example embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, may simply be used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" may generally denote that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions, such as "include" and "may include" which may be used in the present disclosure may refer, for example, to the presence of the disclosed functions, operations, and elements and do not limit one or more additional functions, operations, and elements. In an example embodiment of the present disclosure, the terms, such as "include" and/or "have" may be understood to refer, for example, to a certain characteristic, number, operation, element, component or a combination thereof, but may not be construed to exclude the existence of or a possibility of addition of one or more other characteristics, numbers, operations, elements, components or combinations thereof.

Furthermore, in the present disclosure, the expression "and/or" includes any and all combinations of the associated listed words. For example, the expression "A and/or B" may include A, may include B, or may include both A and B.

In an example embodiment of the present disclosure, expressions including ordinal numbers, such as "first" and "second," and the like, may modify various elements. However, such elements are not limited by the above expressions. For example, the above expressions do not limit the sequence and/or importance of the elements. The above expressions are used merely to distinguish an element from the other elements. For example, a first user device and a second user device may indicate different user devices although both of them are user devices. For example, a first element could be termed a second element, and similarly, a second element could be also termed a first element without departing from the scope of the present disclosure.

In the case where a component is referred to as being "connected" to or "accessed" by another component, it should be understood that not only the component is directly connected to or accessed by the other component, but also there may exist another component between them. Meanwhile, in the case where a component is referred to as being "directly connected" to or "directly accessed" by another component, it should be understood that there is no component therebetween.

An electronic device according to the present disclosure may be a device including a communication function. For example, and without limitation, the device may correspond to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a television (TV), a digital versatile disc (DVD) player, an audio device, various medical devices (for example, magnetic resonance angiography (MRA), magnetic resonance imaging (MRI), computed tomography (CT), a scanning machine, a ultrasonic wave device, and the like), a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, and the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, or the like. It will be apparent to those skilled in the art that the electronic device according to the present disclosure is not limited to the aforementioned devices.

FIG. 1 is a block diagram illustrating example electronic devices in a network environment 100 according to an example embodiment of the present disclosure.

Referring to FIG. 1, an electronic device 101 may include a bus 110, a processor (e.g., including processing circuitry) 120, a memory 130, an input/output interface (e.g., including interface circuitry) 150, a display 160, a communication interface (e.g., including communication circuitry) 170, and other similar and/or suitable components.

The bus 110 may be a circuit which interconnects the above-described elements and delivers a communication (e.g., a control message) between the above-described elements.

The processor 120 may include various processing circuitry and receive commands from the above-described other elements (e.g., the memory 130, the input/output interface 150, the display 160, the communication 170, and the like) through the bus 110, may interpret the received commands, and may execute calculation or data processing according to the interpreted commands. Although illustrated as one element, the processor 120 may include multiple processors and/or cores without departing from the teachings herein. The processor 120 may include various processing circuitry, including a microprocessor or any suitable type of processing circuitry, such as, for example, and without limitation, one or more CPUs, general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. Any of the functions and steps provided in the figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure.

The memory 130 may store commands or data received from the processor 120 or other elements (e.g., the input/output interface 150, the display 160, the communication interface 170, and the like) or generated by the processor 120 or the other elements. The memory 130 may include programming modules 140, such as a kernel 141, middleware 143, an application programming interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, and the like) used to execute operations or functions implemented by other programming modules (e.g., the middleware 143, the API 145, and the application 147). In addition, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. In addition, in relation to work requests received from one or more applications 147 and/or the middleware 143, for example, may perform load balancing of the work requests by using a method of assigning a priority, in which system resources (e.g., the bus 110, the processor 120, the memory 130, and the like) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, and the like.

The input/output interface 150 may include various interface circuitry and, for example, may receive a command or data as input from a user, and may deliver the received command or data to the processor 120 or the memory 130 through the bus 110. The display 160 may display a video, an image, data, and the like, to the user.

The communication interface 170 may include various communication circuitry and connect communication between electronic devices 102 and 104 and the electronic device 101. The communication interface 170 may support a short-range communication protocol (e.g., Wi-Fi, Bluetooth (BT), and near field communication (NFC)), or a network communication (e.g., the internet, a local area network (LAN), a wide area network (WAN), a telecommunication network, a cellular network, a satellite network, a plain old telephone service (POTS), and the like). Each of the electronic devices 102 and 104 may be a device which is identical (e.g., of an identical type) to or different (e.g., of a different type) from the electronic device 101. Further, the communication interface 170 may connect communication between a server 106 and the electronic device 101 via the network 162. Additionally, the communication interface 170 may establish a short-range wireless communication connection 164 between the electronic device 101 and any other electronic device (e.g., electronic device 102).

Figure 2:
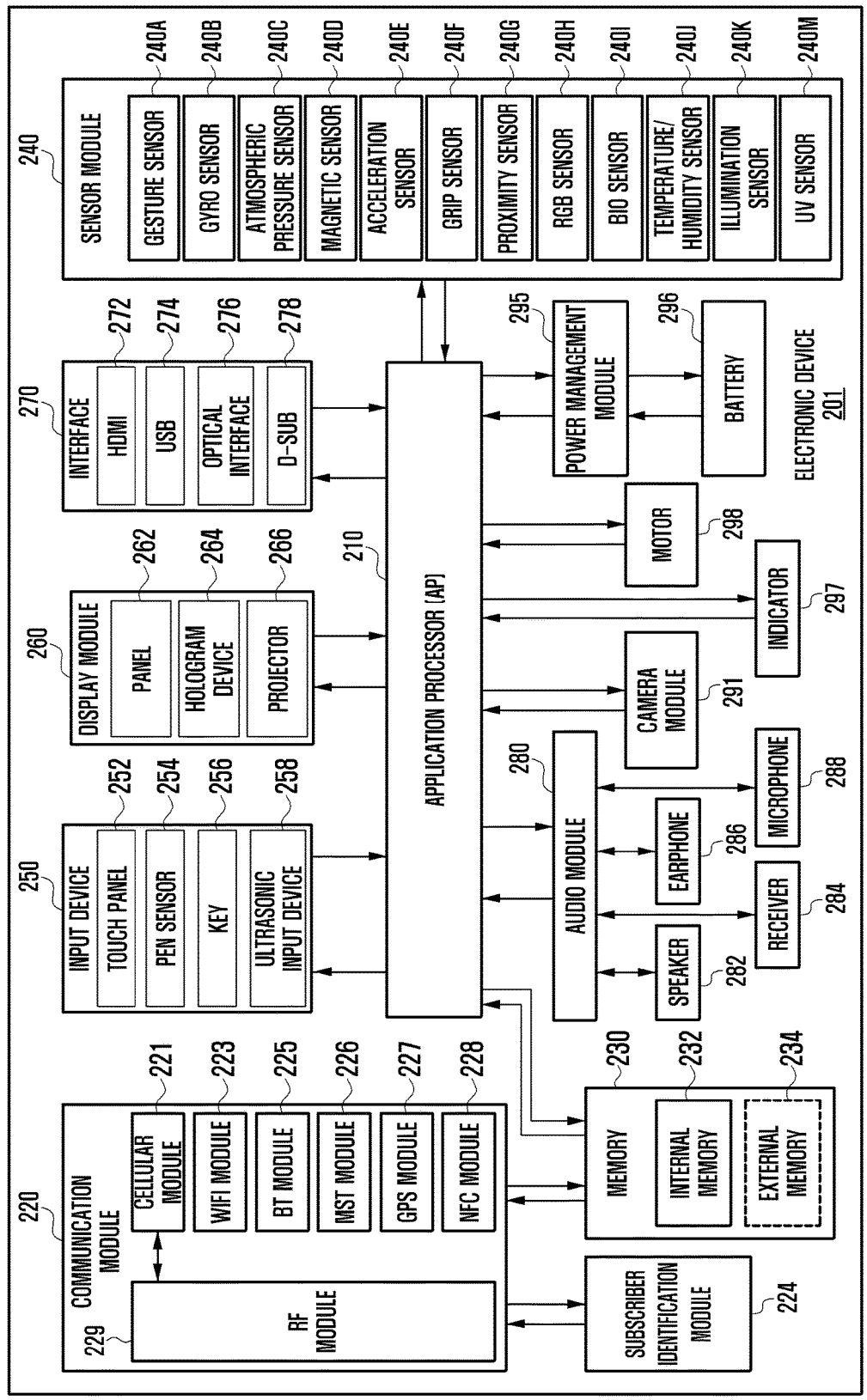
FIG. 2 is a block diagram illustrating an example electronic device according to various example embodiments of the present disclosure.

FIG. 2 is a block diagram illustrating an example electronic device according to an example embodiment of the present disclosure.

Referring to FIG. 2, an electronic device 201 may be, for example, the electronic device 101 illustrated in FIG. 1.

Referring to FIG. 2, the electronic device 201 may include a processor (e.g., and application processor including processing circuitry) 210, a subscriber identification module (SIM) card 224, a memory 230, a communication module (e.g., including communication circuitry) 220, a sensor module 240, an input device (e.g., including input circuitry) 250, a display 260, an interface (e.g., including interface circuitry) 270, an audio module (e.g., including a coder/decoder (codec)) 280, a camera module 291, a power management module 295, a battery 296, an indicator 297, a motor 298 and any other similar and/or suitable components.

The processor 210 may include various processing circuitry, such as, for example, and without limitation, one or more of a dedicated processor, a CPU, application processors (APs) (not illustrated), and one or more communication processors (CPs) (not illustrated). The processor 210 may be, for example, the processor 120 illustrated in FIG. 1. The AP and the CP may be included in the processor 210 in FIG. 2, or may be included in different integrated circuit (IC) packages, respectively. According to an embodiment of the present disclosure, the AP and the CP may be included in one IC package.

The AP may execute an operating system (OS) or an application program, and thereby may control multiple hardware or software elements connected to the AP and may perform processing of and arithmetic operations on various data including multimedia data. The AP may be implemented by, for example, a system on chip (SoC). According to an embodiment of the present disclosure, the processor 210 may further include a graphical processing unit (GPU) (not illustrated).

The CP may manage a data line and may convert a communication protocol in the case of communication between the electronic device (e.g., the electronic device 101) including the electronic device 201 and different electronic devices connected to the electronic device through the network. The CP may be implemented by, for example, an SoC. According to an embodiment of the present disclosure, the CP may perform at least some of multimedia control functions. The CP, for example, may distinguish and authenticate a terminal in a communication network using a SIM (e.g., the SIM card 224). In addition, the CP may provide the user with services, such as a voice telephony call, a video telephony call, a text message, packet data, and the like.

Further, the CP may control the transmission and reception of data by the communication module 220. In FIG. 2, the elements, such as the power management module 295, the memory 230, and the like are illustrated as elements separate from the processor 210. However, according to an example embodiment of the present disclosure, the processor 210 may include at least some of the above-described elements (e.g., the power management module 295).

According to an example embodiment of the present disclosure, the AP or the CP may load, to a volatile memory, a command or data received from at least one of a non-volatile memory and other elements connected to each of the AP and the CP, and may process the loaded command or data. In addition, the AP or the CP may store, in a non-volatile memory, data received from or generated by at least one of the other elements.

The SIM card 224 may be a card implementing a SIM, and may be inserted into a slot formed in a particular portion of the electronic device 201. The SIM card 224 may include unique identification information (e.g., IC card identifier (ICCID)) or subscriber information (e.g., international mobile subscriber identity (IMSI)).

The memory 230 may include an internal memory 232 and/or an external memory 234. The memory 230 may be, for example, the memory 130 illustrated in FIG. 1. The internal memory 232 may include, for example, at least one of a volatile memory (e.g., a dynamic random access memory (DRAM), a static RAM (SRAM), a synchronous dynamic RAM (SDRAM), and the like), and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a not AND (NAND) flash memory, a not OR (NOR) flash memory, and the like). According to an embodiment of the present disclosure, the internal memory 232 may be in the form of a solid state drive (SSD). The external memory 234 may further include a flash drive, for example, a compact flash (CF), a secure digital (SD), a micro-SD, a mini-SD, an extreme digital (xD), a memory stick, and the like.

The communication module 220 may include various communication circuitry including, for example, and without limitation, a radio frequency (RF) module 229. The communication module 220 may be, for example, the communication interface 170 illustrated in FIG. 1. The communication module 220 may further include various communication circuitry including, for example, and without limitation, wireless communication modules to enable wireless communication through the RF module 229. The wireless communication modules may include, for example, and without limitation, a cellular module 221, a Wi-Fi module 223, a BT module 225, a GPS module 227, an NFC module 228, and/or an MST module 226. Additionally or alternatively, the wireless communication modules may further include a network interface (e.g., a LAN card), a modulator/demodulator (modem), and the like for connecting the electronic device 201 to a network (e.g., the internet, a LAN, a WAN, a telecommunication network, a cellular network, a satellite network, a POTS, and the like) (not illustrated).

According to the various embodiment of this invention, the MST module may output MST (magnetic secure transmission) signal. The MST signal may include data containing payment information (i.e. number of credit card, validity data of credit card).

The communication module 220 (e.g., the communication interface 170) may perform data communication with other electronic devices (e.g., the electronic devices 102 and 104, and the server 106) through a network (e.g., network 162).

The RF module 229 may be used for transmission and reception of data, for example, transmission and reception of RF signals or called electronic signals. Although not illustrated, the RF unit 229 may include, for example, a transceiver, a power amplifier module (PAM), a frequency filter, a low noise amplifier (LNA), and the like. In addition, the RF module 229 may further include a component for transmitting and receiving electromagnetic waves in a free space in a wireless communication, for example, a conductor, a conductive wire, and the like.

The sensor module 240 may include, for example, at least one of a gesture sensor 240A, a gyro sensor 240B, an atmospheric pressure (e.g., barometer) sensor 240C, a magnetic sensor 240D, an acceleration sensor 240E, a grip sensor 240F, a proximity sensor 240G a red, green and blue (RGB) sensor 240H, a biometric (e.g., bio) sensor 240I, a temperature/humidity sensor 240J, an illumination (e.g., light) sensor 240K, and an ultra violet (UV) sensor 240M. The sensor module 240 may measure a physical quantity or may detect an operating state of the electronic device 201, and may convert the measured or detected information to an electrical signal. Additionally/alternatively, the sensor module 240 may include, for example, an electronic nose (E-nose) sensor (not illustrated), an electromyography (EMG) sensor (not illustrated), an electroencephalogram (EEG) sensor (not illustrated), an electrocardiogram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein. The sensor module 240 may also, or in the alternative, be controlled by the processor 210.

The input device 250 may include various input circuitry, such as, for example, and without limitation, a touch panel 252, a pen sensor 254 (e.g., a digital pen sensor), keys 256, and an ultrasonic input device 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. In addition, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input device 258 enables the terminal to detect a sound wave by using a microphone (e.g., a microphone 288) of the terminal through a pen generating an ultrasonic signal, and to identify data. The ultrasonic input device 258 is capable of wireless recognition. According to an embodiment of the present disclosure, the electronic device 201 may receive a user input from an external device (e.g., a network, a computer, or a server), which is connected to the electronic device 201, through the communication module 220.

The display 260 may include a panel 262, a hologram 264, and a projector 266. The display 260 may be, for example, the display 160 illustrated in FIG. 1. The panel 262 may be, for example, a liquid crystal display (LCD) and an active matrix organic light emitting diode (AM-OLED) display, or the like, but is not limited thereto. The panel 262 may be implemented so as to be, for example, flexible, transparent, or wearable. The panel 262 may include the touch panel 252 and one module. The hologram 264 may display a three-dimensional image in the air by using interference of light. The projector 266 may include light-projecting elements, such as LEDs, to project light into external surfaces. According to an embodiment of the present disclosure, the display 260 may further include a control circuit for controlling the panel 262, the hologram 264, or the projector 266.

The interface 270 may include various interface circuitry, such as, for example, and without limitation, a high-definition multimedia interface (HDMI) 272, a universal serial bus (USB) 274, an optical interface 276, and a d-subminiature (D-sub) 278. Additionally or alternatively, the interface 270 may include, for example, SD/multi-media card (MMC) (not illustrated) or infrared data association (IrDA) (not illustrated).

The audio module (e.g., including a codec) 280 may bidirectionally convert between a voice and an electrical signal. The audio module 280 may convert voice information, which is input to or output from the audio module 280, through, for example, a speaker 282, a receiver 284, an earphone 286, the microphone 288, and the like.

The camera module 291 may capture an image and a moving image. According to an embodiment of the present disclosure, the camera module 291 may include one or more image sensors (e.g., a front lens or a back lens), an image signal processor (ISP) (not illustrated), and a flash LED (not illustrated).

The power management module 295 may manage power of the electronic device 201. Although not illustrated, the power management module 295 may include, for example, a power management IC (PMIC), a charger IC, or a battery fuel gauge.

The PMIC may be mounted to, for example, an IC or an SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, and the like) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the electronic device 201 or a part of the electronic device 201 (e.g., the AP), for example, a booting state, a message state, a charging state and the like. The motor 298 may convert an electrical signal into a mechanical vibration.

Although not illustrated, the electronic device 201 may include a processing unit (e.g., a GPU) for supporting a module TV. The processing unit for supporting a module TV may process media data according to standards, such as, for example, digital multimedia broadcasting (DMB), digital video broadcasting (DVB), media flow, and the like. Each of the above-described elements of the electronic device 201 according to an embodiment of the present disclosure may include one or more components, and the name of the relevant element may change depending on the type of electronic device. The electronic device 201 according to an embodiment of the present disclosure may include at least one of the above-described elements. Some of the above-described elements may be omitted from the electronic device 201, or electronic device 201 may further include additional elements. In addition, some of the elements of the electronic device 201 according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," and the like. The "module" may be a minimum unit of a component formed as one body or a part thereof. The "module" may be a minimum unit for performing one or more functions or a part thereof. The "module" may be implemented mechanically or electronically. For example, and without limitation, the "module" according to an example embodiment of the present disclosure may include at least one of a dedicated processor, a CPU, an application-specific integrated circuit (ASIC) chip, a field-programmable gate array (FPGA), and a programmable-logic device for performing certain operations which have been known or are to be developed in the future.

Figure 3:
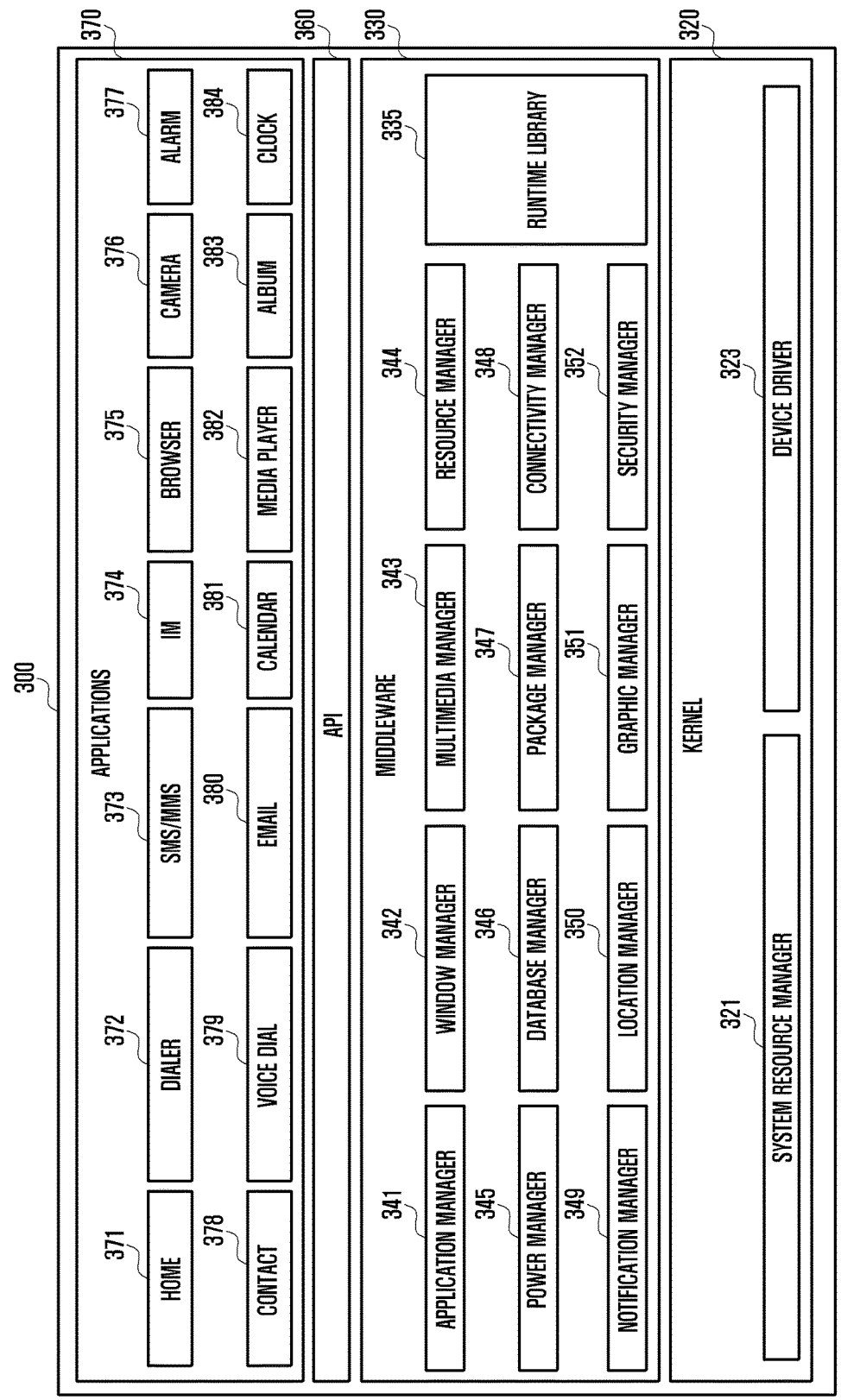
FIG. 3 is a block diagram illustrating an example program module according to various example embodiments of the present disclosure.

FIG. 3 is a block diagram illustrating an example configuration of a programming module according to an example embodiment of the present disclosure.

Referring to FIG. 3, a programming module 300 may be included (or stored) in the electronic device 101 (e.g., the memory 130) or may be included (or stored) in the electronic device 201 (e.g., the memory 230) illustrated in FIG. 1. At least a part of the programming module 300 may be implemented in software, firmware, hardware, or a combination of two or more thereof. The programming module 300 may be implemented in hardware (e.g., the electronic device 201), and may include an OS controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 300 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). In addition, according to an embodiment of the present disclosure, the device driver 323 may include an inter-process communication (IPC) driver (not illustrated).

The middleware 330 may include multiple modules previously implemented so as to provide a function used in common by the applications 370. In addition, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity, such as, for example, Wi-Fi and BT. The notification manager 349 may display or report, to the user, an event, such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. In addition, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the processor 210), the one or more processors may perform functions corresponding to the instructions. The non-transitory computer-readable storage medium may be, for example, the memory 230. At least a part of the programming module 300 may be implemented (e.g., executed) by, for example, the processor 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. In addition, some of the operations may be omitted, or other operations may be added to the operations.

Figure 4:
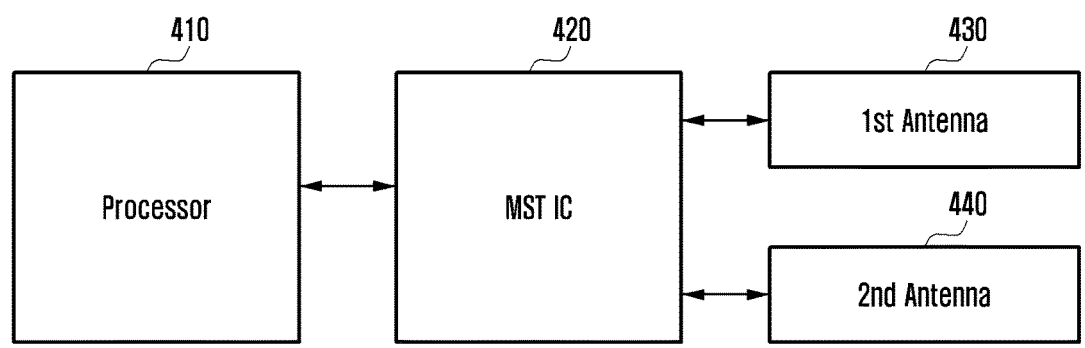
FIG. 4 is a block diagram illustrating example elements of an example electronic device according to various example embodiments of the present disclosure.

FIG. 4 is a block diagram illustrating example elements of an example electronic device according to various example embodiments of the present disclosure.

As illustrated in FIG. 4, the electronic device according to various example embodiments may include a processor (e.g., including processing circuitry) 410, a magnetic stripe transmission (MST) integrated circuit (IC) (e.g., including MST circuitry) 420, a first antenna 430, and a second antenna 440.

In this disclosure, two different surfaces comprise the outward appearance of the electronic device and may be referred to, for example, as a first surface and a second surface. Also, a first direction may refer, for example, to the direction from the first surface to the outside of the electronic device, and a second direction may refer, for example, to the direction from the second surface to the outside of the electronic device.

The first antenna 430 may be disposed near the first surface of the electronic device and may output a signal in the first direction. The second antenna 440 may be disposed near the second surface of the electronic device and may output a signal in the second direction.

According to an embodiment, the first direction and the second direction may indicate different directions. For example, the first direction, which is a traveling direction of a signal output by the first antenna 430, and the second direction, which is a traveling direction of a signal output by the second antenna 440, may be at 180 degrees, namely, opposite to each other.

According to an example embodiment, the second surface of the electronic device may refer, for example, to a surface (e.g., the front face of the electronic device) on which a display of the electronic device is exposed. The first surface of the electronic device may refer, for example, to a surface (e.g., the rear face of the electronic device) which includes a back cover of the electronic device. Assuming that the first surface including the back cover is placed downward and the second surface on which the display is exposed is placed upward, the first antenna 430 may be disposed on the first surface including the back cover, and the second antenna 440 may be disposed under the second surface on which the display is exposed.

According to another embodiment, the second surface of the electronic device may refer, for example, to the rear face including the back cover, and the first surface of the electronic device may refer, for example, to the front face on which the display is exposed. Assuming that the second surface including the back cover is placed downward and the first surface on which the display is exposed is placed upward, the second antenna 440 may be disposed on the second surface including the back cover, and the first antenna 430 may be disposed under the first surface on which the display is exposed.

In any of such various example embodiments, the first antenna 430 may be disposed between the first and second surfaces and in parallel with the first and second surfaces. The second antenna 440 may be disposed between the second surface and the first antenna 430 and in parallel with the first and second surfaces.

According to still another example embodiment, the first surface of the electronic device may refer, for example, to any one of lateral sides of the electronic device (e.g., any surface other than the front and rear surfaces), and the second surface of the electronic device may denote another lateral side facing the first surface.

Figure 6A:
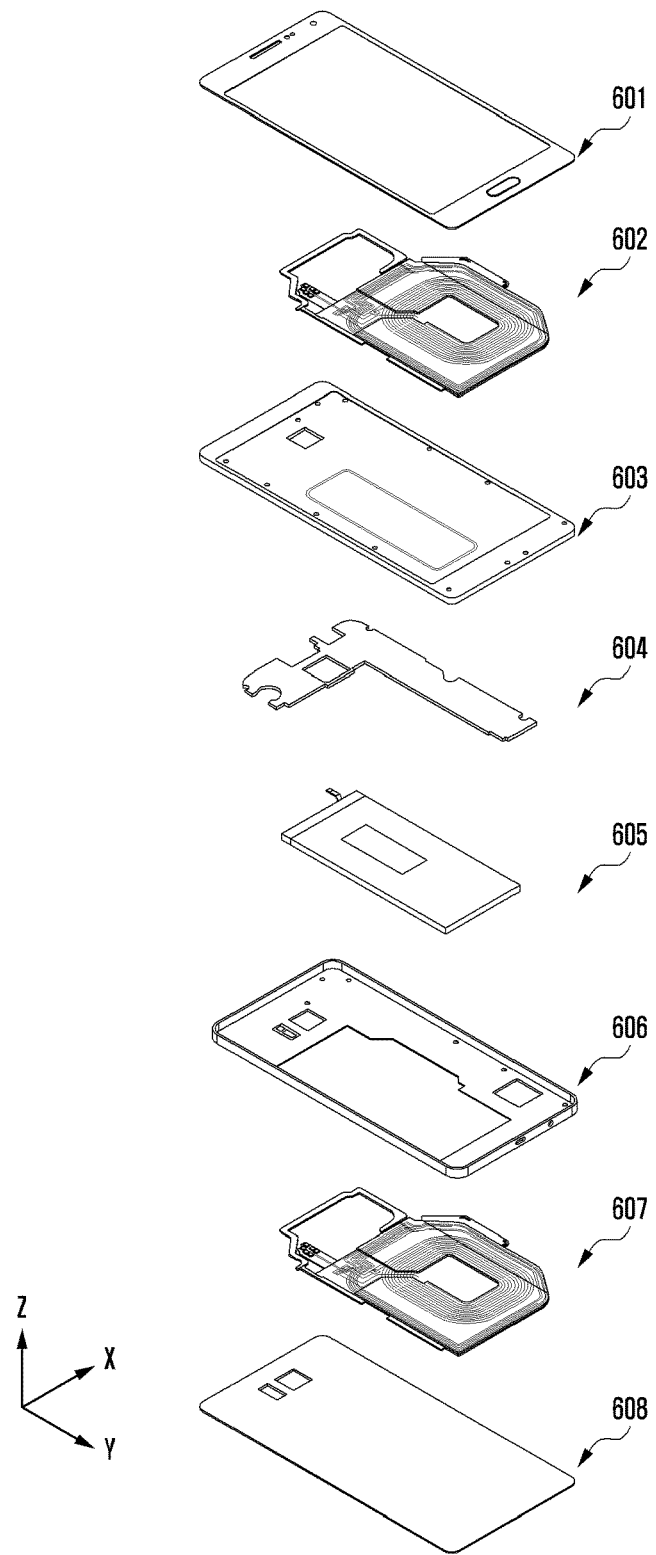
FIGS. 6A and 6B are exploded perspective views illustrating example elements of an example electronic device according to various example embodiments of the present disclosure.
Figure 6B:
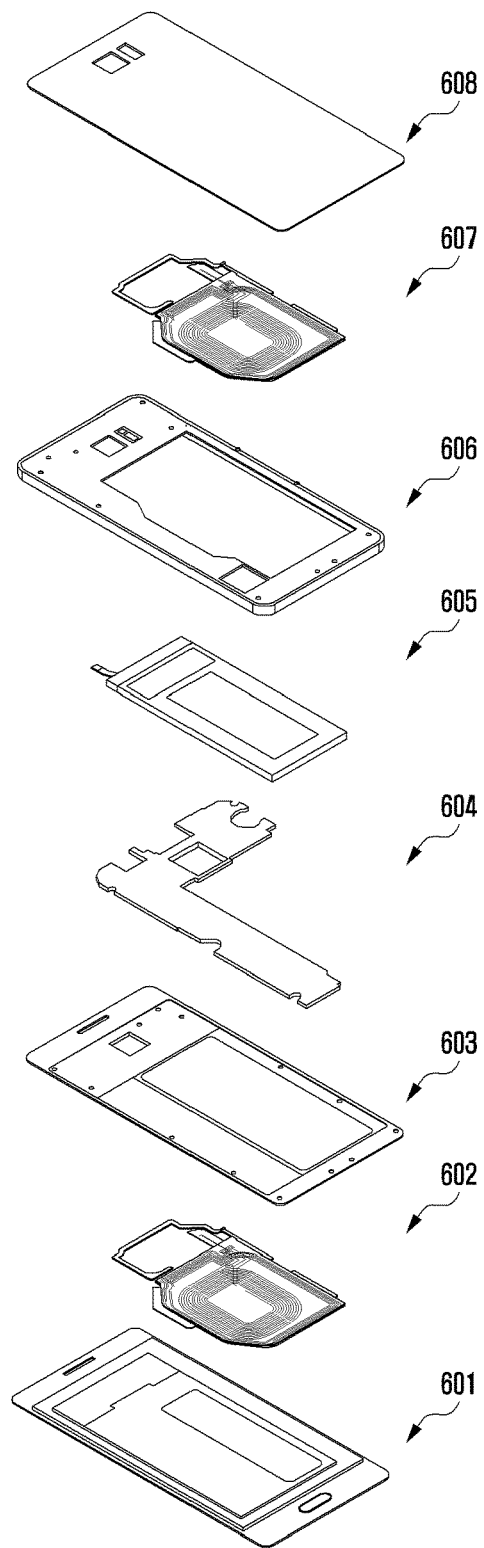

When the first and second surfaces of the electronic device correspond to the front and rear faces of the electronic device, each of the first and second antennas 430 and 440 may comprise a planar coil, which as illustrated in FIGS. 6A and 6B.

When the first and second surfaces of the electronic device correspond to the lateral sides of the electronic device, each of the first and second antennas 430 and 440 may comprise a solenoid-shaped coil (not shown).

The MST IC 420 may control the first antenna 430 and the second antenna 440. For example, the MST IC 420 may receive, from the processor 410, a signal to instruct either the first antenna 430 or the second antenna 440 to output an MST signal including data on payment information, and it may control the first and second antennas 430 and 440, based on the instruction signal.

The payment information may include various kinds of information about payment, such as a credit card, a check card, a debit card, and the like, of an electronic device user. According to an embodiment, the payment information may include an actual card number of the user's payment means, a virtual card number, and the like. Also, the payment information may include a validity period thereof in case of being contained in the MST signal. For example, the MST signal may have a validity period of 1 minute and 30 seconds for security reasons. If the MST signal is not received by an MST receiver within 1 minute and 30 seconds from the time when the MST signal is output, the MST signal will be considered as an invalid signal from then on; thus, a normal payment may not be performed.

The MST IC 420 may be implemented, for example, and without limitation, in two channels to use a channel connected to the first antenna 430 and another channel connected to the second antenna 440. According to another embodiment, two MST ICs may be provided such that each MST IC may control a corresponding one of the first and second antennas 430 and 440.

The processor 410 may check whether a payment mode is executed. Also, in response to execution of the payment mode, the processor 410 may control the MST IC 420.

The payment mode may refer, for example, to a particular mode for processing a task of performing payment in various payment applications installed in the electronic device. According to an embodiment, the task of performing payment may include operation of outputting an MST signal including payment information.

The payment mode may be executed when a user's body information (e.g., a user's fingerprint, a user's iris pattern, a user's voice, a user's face shape, or the like) and a user-entered password (e.g., a combination of numbers and letters, a gesture input, or the like) are received and also when the received information and password are identical with the pre-stored information and password.

Unfortunately, in prior systems, while the MST signal is output to the outside, any malicious third party may receive the MST signal and then perform the payment using the MST signal within the valid period of the MST signal. In order to address this problem, the electronic device according to various example embodiments of the present disclosure may provide a solution for preventing and/or reducing wiretapping of the MST signal and/or for reducing the output time of the MST signal. Hereinafter, two such solutions will be described as illustrative non-limiting examples.

In response to execution of the payment mode, the processor 410 according to various embodiments may control the MST IC 420 such that one of the first and second antennas 430 and 440 outputs the MST signal and the other outputs a jamming signal.

According to an example embodiment, the processor 410 may control the MST IC 420 such that the first antenna 430 outputs the MST signal and the second antenna 440 outputs the jamming signal.

According to another example embodiment, the processor 410 may control the MST IC 420 such that the first antenna 430 outputs the jamming signal and the second antenna 440 outputs the MST signal.

The jamming signal may refer, for example, to a signal that prevents and/or reduces wiretapping of the MST signal. According to an example embodiment, the jamming signal may be implemented as a jitter signal, for example, having the same frequency band as the MST signal.

The jamming signal may prevent and/or reduce a malicious third party wishing to use the MST signal from wiretapping the MST signal. For example, when the MST signal that allows reception within a distance of 5 centimeters from the electronic device is output, the malicious third party located at a distance of 50 centimeters may obtain the MST signal using an antenna that is nine times larger than an antenna of an MST signal receiver. However, when the jamming signal is output, the malicious third party fails to wiretap or receive the MST signal because of simultaneously receiving the jamming signal and the MST signal.

The MST signal receiver may refer to a device capable of receiving the MST signal. According to an embodiment, the MST signal receiver may include a payment terminal, often referred to as a point of sale (POS), capable of receiving the MST signal from the electronic device and performing a payment process.

The processor 410 may synchronize the MST signal and the jamming signal such that the jamming signal and the MST signal are simultaneously output. According to an embodiment, the processor 410 may control the MST signal to match the timing of outputting the MST signal with the timing of outputting the jamming signal. By the simultaneous output of the MST signal and the jamming signal, the amount of power consumed by an oscillator generating both the MST signal and the jamming signal is similar to the amount of power consumed by an oscillator generating the MST signal only. Therefore, the power consumption in case of outputting both the MST signal and the jamming signal may be similar to the power consumption in case of outputting only the MST signal.

The processor 410 may control the output strength of the jamming signal, based on the output strength of the MST signal. For example, if the output of the MST signal is increasingly stronger, the processor 410 may also output the jamming signal increasingly stronger.

According to various embodiments, the jamming signal may be output in a direction different from a traveling direction of the MST signal. For this, the processor 410 may control the first and second antennas 430 and 440 such that a signal output direction of the first antenna 430 is different from a signal output direction of the second antenna 440.

The jamming signal may prevent and/or interfere with a malicious third party wishing to use the MST signal from wiretapping the MST signal. However, the jamming signal may interfere with the reception of the MST signal by the MST receiver that normally performs the payment. Therefore, in order to prevent and/or avoid this interference, the electronic device according to various embodiments may include at least one shielding film between the first and second antennas 430 and 440. A more detailed description of the shielding film will be provided below with reference to FIG. 7.

In order to minimize and/or reduce an output time of the MST signal, the electronic device according to various embodiments may identify (determine) a proximity between the electronic device and the MST signal receiver and then, based on the identified (determined) proximity, determine whether to output the MST signal. If the proximity between the MST signal receiver and the electronic device is equal to or greater than a predetermined value, the electronic device may output the MST signal. This may reduce a time for a malicious third party to attempt the wiretapping of the MST signal.

In order to measure (determine) the proximity between the electronic device and the MST signal receiver, the processor 410 may utilize various sensors equipped in the electronic device. According to an embodiment, an infrared sensor among various sensors of the electronic device may be used for measuring the proximity between the electronic device and the MST signal receiver. For example, infrared rays output from the infrared sensor are reflected by the MST signal receiver and then returned to the infrared sensor. Then, using a difference between the output time and the return time, the infrared sensor may measure the proximity between the electronic device and the MST signal receiver. Using such data collected from the infrared sensor, the processor 410 may identify (determine) the proximity between the electronic device and the MST signal receiver and determine whether to output the MST signal.

According to another embodiment, using an acceleration sensor of the electronic device, the processor 410 may determine whether to output the MST signal. The acceleration sensor may sense a moving speed, a moving direction, and a moving or stationary state of the electronic device. The processor 410 may use data collected by the acceleration sensor to determine whether the electronic device remains stationary. If the electronic device is in a stationary state, the processor 410 may control the MST IC 420 to output the MST signal. Considering that the user brings the electronic device closer to the MST signal receiver in performing a payment using the electronic device, the electronic device may be seen as moving toward the MST signal receiver and then stopping near the MST signal receiver. Since the electronic device according to various embodiments may output the MST signal when the electronic device is stopped, the output time of the MST signal is reduced. This may reduce a time for a malicious third party to attempt the wiretapping of the MST signal.

According to still another embodiment, the processor 410 may identify a proximity between the electronic device and the MST signal receiver, based on whether any communication (e.g., short-range wireless communication) is connected between the electronic device and the MST signal receiver. For example, when the communication between the electronic device and the MST signal receiver is connected using near field communication (NFC) having a communication range of 4 cm to 20 cm, the processor 410 may determine that the electronic device approaches the MST signal receiver and therefore determine to output the MST signal. Although the short-range wireless communication is assumed to be NFC as above, the processor 410 may, without limitation, use any other wireless communication technique with a small communication coverage so as to measure the proximity.

According to yet another embodiment, the processor 410 may select an antenna to output the MST signal and an antenna to output the jamming signal from among the first and second antennas 430 and 440, based on a posture of the electronic device.

The posture of the electronic device may refer, for example, to a relative placement of the electronic device with respect to the MST signal receiver. The posture of the electronic device may be measured using, for example, and without limitation, a gyroscope sensor and, if necessary, further using additional sensors such as an infrared sensor of the electronic device. Using the posture of the electronic device, the processor 410 may determine an outer surface of the electronic device closest to the MST signal receiver and also determine a specific antenna corresponding to the closest surface as the antenna to output the MST signal.

For example, when a distance between the MST signal receiver and the first surface of the electronic device is greater than a distance between the MST signal receiver and the second surface of the electronic device, the processor 410 may control the second antenna 440 capable of outputting a signal through the second surface to output the MST signal and also control the first antenna 430 capable of outputting a signal through the first surface to output the jamming signal.

Similarly, when a distance between the MST signal receiver and the first surface of the electronic device is smaller than a distance between the MST signal receiver and the second surface of the electronic device, the processor 410 may control the first antenna 430 capable of outputting a signal through the first surface to output the MST signal and also control the second antenna 440 capable of outputting a signal through the second surface to output the jamming signal.

Figure 5:
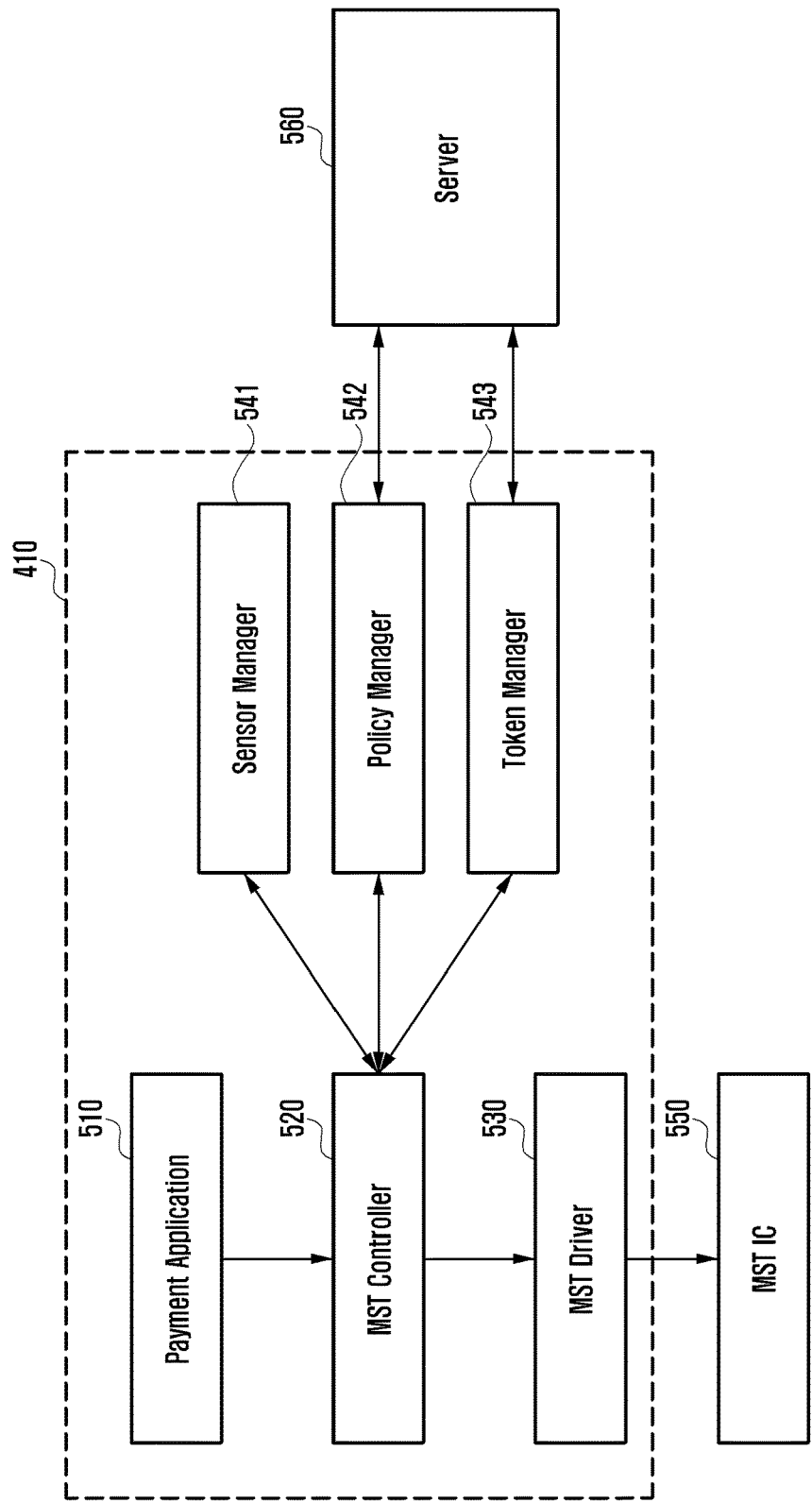
FIG. 5 is a block diagram illustrating various example software elements (e.g., program elements) for performing an example operating method of an electronic device according to various example embodiments of the present disclosure.

FIG. 5 is a block diagram illustrating software (program) elements for performing an operating method of an electronic device according to various example embodiments of the present disclosure.

As illustrated in FIG. 5, the software or program elements for performing the operating method of the electronic device may include a payment application 510, an MST controller 520, an MST driver 530, a sensor manager 541, a policy manager 542, and a token manager 543.

In particular, these software elements may be implemented using processing of the various program or software elements by the processor 410 as illustrated in FIG. 4.

The payment application 510 may refer, for example, to various types of programs capable of performing payment in the electronic device. On the payment application 510, the user may confirm the progress of payment and whether a payment mode is executed.

The MST controller 520 may control the MST IC 550 such that one of the first and second antennas 430 and 440 outputs the MST signal and the other antenna outputs the jamming signal for interfering with the wiretapping of the MST signal. The MST controller 520 may generate a signal for controlling the MST IC 550 and transmit the control signal to the MST IC 550, using the MST driver 530.

The MST controller 520 may identify the proximity between the electronic device and the MST signal receiver and then, based on the identified proximity, determine whether to output the MST signal. The MST controller 520 may use the sensor manager 541 to identify the proximity between the electronic device and the MST signal receiver. The sensor manager 541 may perform a function of managing sensors included in the electronic device. According to an embodiment, the sensor manager 541 may control the infrared sensor of the electronic device to measure the proximity between the electronic device and the MST signal receiver. In order to identify the proximity between the electronic device and the MST signal receiver, the MST controller 520 may also determine whether there is any short-range wireless communication connection between the electronic device and the MST signal receiver.

The MST controller 520 may determine an antenna for outputting the MST signal and another antenna for outputting the jamming signal that interferes with the wiretapping of the MST signal.

The MST controller 520 may control the MST signal based on various policies for outputting the MST signal. For example, MST signaling policies (e.g., the validity period of the MST signal, the distance between the electronic device and the MST signal receiver, etc.) may be variously operated in each country. Therefore, the MST controller 520 that controls the MST signal may consider the policy received from an external server 560 (which may be implemented in the form of a cloud) by using the policy manager 542.

The MST controller 520 may receive token information from the external server 560 using the token manager 543 and output the MST signal including the received token information. A token may refer, for example, to data that contains a random number cipher converted from credit card information. The token used in the electronic device according to various embodiments may be generated by various techniques well known in the art; thus, a related description will be omitted herein.

The token information may include at least one of several kinds of information about a payment means (e.g., a credit card) used for payment, such as a virtual number (token) of card, a validity period, a card verification code (CVC, also referred to as a card security code (CSC) or a card verification value (CVV)), and a type of card (e.g., a magnetic credit card, an IC chip-embedded card, etc.).

The MST driver 530 may convert the control signal transmitted from the MST controller 520 into a signal usable in the MST IC 550.

FIGS. 6A and 6B are exploded perspective views illustrating example elements of an example electronic device according to various example embodiments of the present disclosure.

For example, FIGS. 6A and 6B illustrate elements of the electronic device illustrated in FIG. 4. In addition, FIG. 6A illustrates the electronic device when a first surface 601 on which the display is exposed is placed upward, and FIG. 6B shows the electronic device when a second surface 608 including the back cover is placed upward.

As seen from FIG. 6A, the electronic device in various embodiments may include the first surface 601 on which the display is exposed, some frames 603, 604, and 606 that are inserted in the electronic device, and the second surface 608 having the back cover.

For example, the electronic device illustrated in FIG. 6A may include, in the form of a stack, the first surface 601, a second antenna 602 disposed under the first surface 601 and capable of outputting either the MST signal or the jamming signal that interferes with the MST signal, a first frame 603 disposed under the second antenna 602 and used for fixing components of the electronic device, a second frame 604 disposed under the first frame 603, a battery 605 disposed under or on the same plane as the second frame 604, a third frame 606 disposed under the battery 605 and fixing the second frame 604 and the battery 605, a first antenna 607 disposed under the third frame 606 and capable of outputting either the MST signal or the jamming signal, and the second surface 608 including the back cover. The stacking order of elements illustrated in FIG. 6A is an example only, and some elements may be omitted or changed in order according to a designer's intention. Meanwhile, the electronic device illustrated in FIG. 6B is the same as the electronic device shown in FIG. 6A, and is merely drawn in an inverted manner.

Although the first and second antennas 607 and 602 are illustrated as planar coils in FIGS. 6A and 6B, the shapes of the first and second antennas 607 and 602 are not limited thereto. The shapes of the first and second antennas 607 and 602 may be modified according to a designer's intention. For example, the second antenna 602 which may be disposed under the display may be implemented in a solenoidal form to avoid interference with currents flowing in the display.

Figure 7:
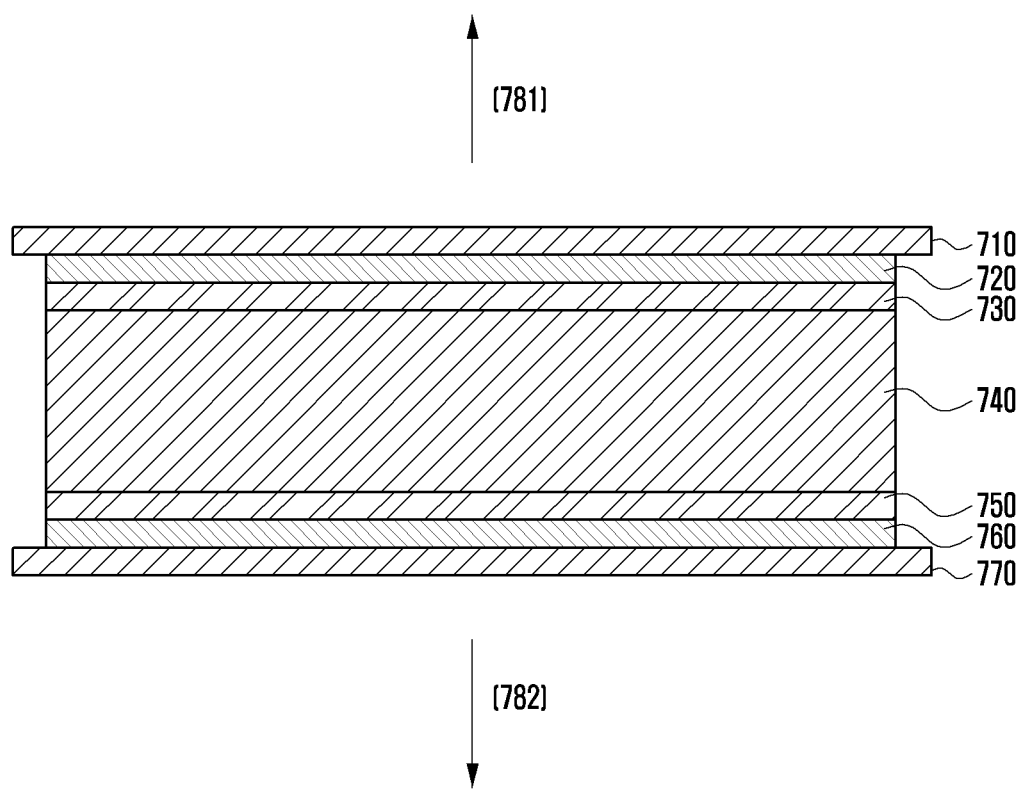
FIG. 7 is a cross-sectional view illustrating an example electronic device according to various example embodiments of the present disclosure.

FIG. 7 is a cross-sectional view illustrating an example electronic device according to various example embodiments of the present disclosure.

As illustrated in FIG. 7, the electronic device according to various embodiments may include a back cover 710, a region 720 in which the first antenna is disposed, a first shielding film 730 for blocking the progress of a signal output by the first antenna toward a surface 770 on which the display is exposed, a space 740 in which various components of the electronic device are provided, a second shielding film 750 for blocking the progress of a signal output by the second antenna toward the back cover 710, a region 760 in which the second antenna is disposed, and a surface 770 on which the display is exposed.

In particular, the electronic device illustrated in FIG. 7 may include the first shielding film 730 and the second shielding film 750.

The second shielding film 750 may prevent and/or shield the signal output by the second antenna from traveling toward the back cover 710. The first shielding film 730 may prevent and/or shield the signal output by the first antenna from traveling toward the surface 770 where the display is exposed. Because of the first and second shielding films 730 and 750, a first direction 781, which is a traveling direction of the signal output by the first antenna, may be opposite to a second direction 782, which is a traveling direction of the signal output by the second antenna.

According to an embodiment, the processor 410 may control the first antenna to output the MST signal and also control the second antenna to output the jamming signal for interfering with the wiretapping of the MST signal (e.g., when a distance between the back cover 710 and the MST signal receiver having to normally receive the MST signal is smaller than a distance between the MST signal receiver and the surface 770 where the display is exposed). The second shielding film 750 may be disposed in order to prevent and/or shield the jamming signal from disabling the MST signal receiver, not a malicious third party, to receive the MST signal. By the second shielding film 750, the jamming signal may not travel in the first direction 781 of the MST signal. In addition, the first shielding film 730 may be disposed to minimize and/or reduce the arrival of the MST signal at a malicious third party. Since the first shielding film 730 may minimize and/or reduce the progress of the MST signal, output by the first antenna, toward the second direction 782, it is possible to block the wiretapping of the MST signal by the malicious third party.

According to another embodiment, the processor may control the first antenna to output the jamming signal for interfering with the wiretapping of the MST signal, and also control the second antenna to output the MST signal (e.g., when a distance between the back cover 710 and the MST signal receiver having to normally receive the MST signal is smaller than a distance between the MST signal receiver and the surface 770 where the display is exposed). The first shielding film 730 may prevent and/or reduce the progress of the jamming signal, output by the first antenna, toward the second direction 782 such that the jamming signal does not arrive at the MST signal receiver. The second shielding film 750 may prevent and/or reduce the progress of the MST signal, output by the second antenna, toward the first direction 781 such that the MST signal is not exposed to the malicious third party.

The first and second shielding films 730 and 750 may comprise various materials having a property of absorbing electromagnetic waves. For example, and without limitation, a ferrite material having a property of absorbing electromagnetic waves may be used for manufacturing the first and second shielding films 730 and 750.

According to various example embodiments of the present disclosure, an electronic device may include a first antenna, a second antenna, a magnetic stripe transmission (MST) integrated circuit (IC), and a processor. The first antenna may be disposed between first and second surfaces of the electronic device and in parallel with the first and second surfaces of the electronic device, the first antenna configured to output a signal in a first direction. The second antenna may be disposed between the second surface of the electronic device and the first antenna and in parallel with the first and second surfaces of the electronic device, the second antenna configured to output a signal in a second direction. The MST IC may be configured to control the first and second antennas. The processor may be configured to control, when a payment mode is executed, the MST IC such that one of the first and second antennas outputs an MST signal and the other of the first and second antennas outputs a jamming signal for interfering with wiretapping of the MST signal.

In the electronic device according to various example embodiments, the second antenna may be disposed under a display of the electronic device, and the first antenna may be disposed near a particular one of surfaces of the electronic device, the particular surface being opposite to the display.

In the electronic device according to various example embodiments, the processor may be further configured to determine a proximity between the electronic device and an MST signal receiver and, based on the determined proximity, to determine whether to output the MST signal.

In the electronic device according to various example embodiments, the processor may be further configured to determine the proximity between the electronic device and the MST signal receiver, based at least on data collected by an infrared sensor of the electronic device and whether there is a communication connection between the electronic device and the MST signal receiver.

In the electronic device according to various example embodiments, the processor may be further configured to determine whether the electronic device is stationary, based on data collected by an acceleration sensor of the electronic device, and to determine whether to output the MST signal, based on whether the electronic device is stationary.

Additionally, the electronic device according to various example embodiments may further include at least one shielding film disposed between the first and second antennas.

In the electronic device according to various example embodiments, the processor may be further configured to synchronize the MST signal and the jamming signal such that the MST signal and the jamming signal are simultaneously output.

In the electronic device according to various example embodiments, the processor may be further configured to determine a relative posture of the electronic device with respect to an MST signal receiver and then, based on the relative posture, to determine a specific antenna of the first and second antenna for outputting the MST signal.

In the electronic device according to various example embodiments, the processor may be further configured to control the first antenna to output the MST signal and to control the second antenna to output the jamming signal when a distance between the first surface and the MST signal receiver is less than a distance between the second surface and the MST signal receiver.

In the electronic device according to various example embodiments, the processor may be further configured to control the second antenna to output the MST signal and to control the first antenna to output the jamming signal when a distance between the first surface and the MST signal receiver is greater than a distance between the second surface and the MST signal receiver.

In the electronic device according to various example embodiments, the processor may be further configured to control output strength of the jamming signal, based on output strength of the MST signal.

According to various example embodiments of the present disclosure, an electronic device may include a first antenna disposed between first and second surfaces of the electronic device and in parallel with the first and second surfaces of the electronic device, the first antenna configured to output a signal in a first direction, a second antenna disposed between the second surface of the electronic device and the first antenna and in parallel with the first and second surfaces of the electronic device, the second antenna configured to output a signal in a second direction, a magnetic stripe transmission (MST) integrated circuit (IC) configured to control the first and second antennas, and a processor configured to control the MST IC. When a payment mode is executed, the processor may be configured to determine whether to output an MST signal, based on a motion of the electronic device; to determine an antenna for outputting the MST signal and another antenna for outputting a jamming signal for interfering with wiretapping of the MST signal from among the first and second antennas, based on a posture of the electronic device; and to control the MST IC to output the jamming signal in response to output of the MST signal.

Figure 8:
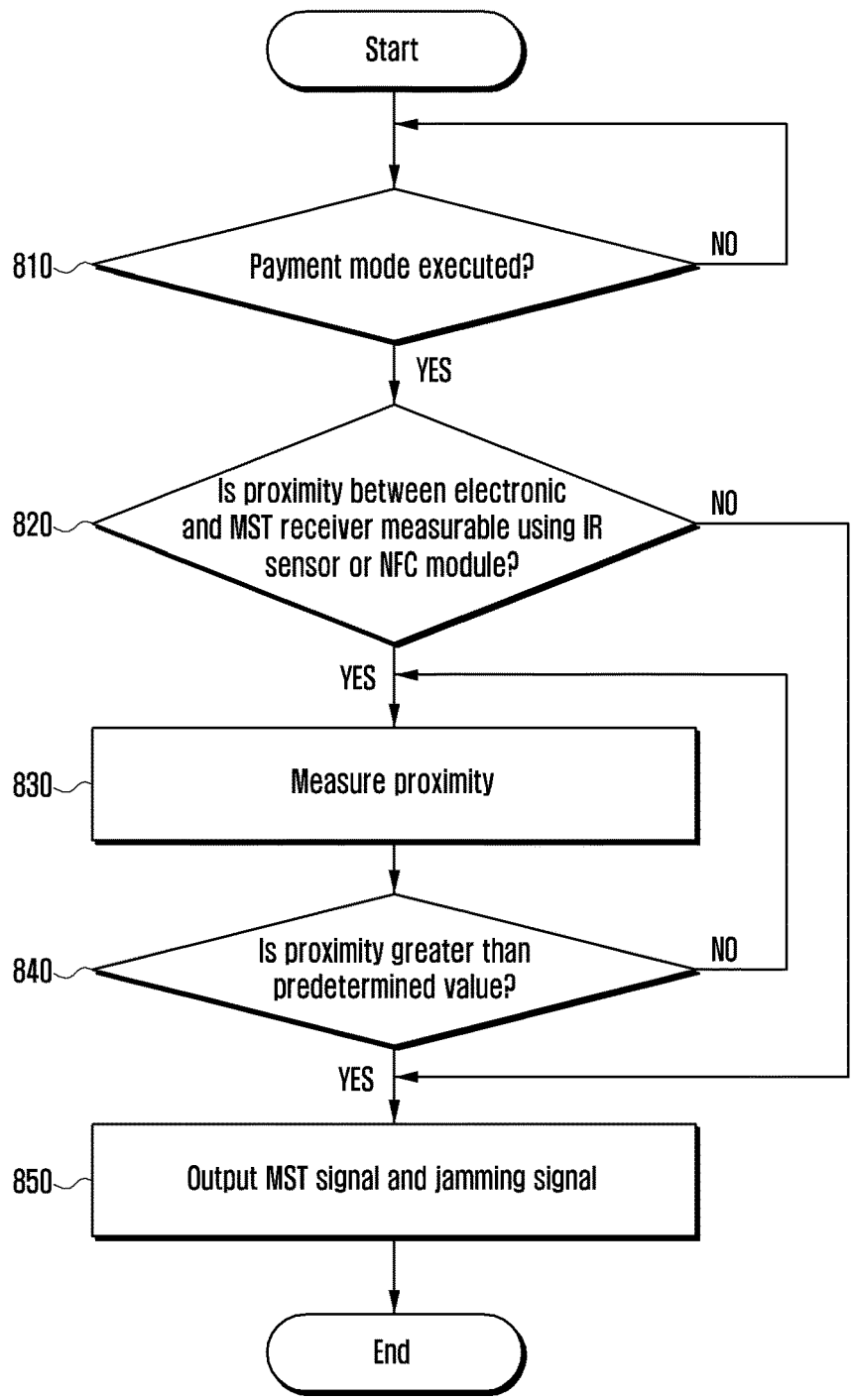
FIG. 8 is a flowchart illustrating an example operating method of an electronic device according to an example embodiment of the present disclosure.

FIG. 8 is a flowchart illustrating an example operating method of an electronic device according to an example embodiment of the present disclosure.

As illustrated in FIG. 8, the operating method of the electronic device according to an embodiment may include operations 810 to 850, which may be performed, for example, by the electronic device illustrated in FIG. 4. Each of the operations 810 to 850 may be implemented, for example, with instructions that are executable by the processor (e.g., 410 in FIGS. 4 and 5) of the electronic device. These instructions may be stored, for example, in the memory of the electronic device.

At operation 810, the processor 410 may determine whether a payment mode is executed.

The payment mode may refer, for example, to a particular mode for processing a task of performing payment in various payment applications installed in the electronic device. Because the execution of the payment mode is discussed above with reference to FIG. 4, a repetition of the description is omitted herein.

When the payment mode is executed, the processor 410 may determine at operation 820 whether a proximity between the MST signal receiver and the electronic device is measurable using the infrared sensor or the short-range communication module.

For example, the processor 410 may measure the proximity between the MST signal receiver and the electronic device, based on a difference between an output time when the infrared sensor outputs an infrared ray and a reception time when the infrared sensor receives a returned infrared ray reflected by the MST signal receiver.

When the MST signal receiver has any short-range communication module, the processor 410 may measure the proximity based on whether the electronic device and the MST signal receiver are connected. Because this was discussed previously with reference to FIG. 4, a repetition of the description will be omitted herein.

If the proximity measurement is possible, the processor 410 may measure the proximity between the electronic device and the MST signal receiver at operation 830, and then it may compare the measured proximity with a predetermined value at operation 840 so as to determine whether the proximity is greater than the predetermined value.

If the proximity is smaller than the predetermined value, the processor 410 may return to the operation 830 to continuously measure the proximity. If the proximity is greater than the predetermined value, the processor 410 may output the MST signal and the jamming signal at operation 850.

As described above, the MST signal and the jamming signal may have different traveling directions. Therefore, although the jamming signal is not transmitted to the MST signal receiver, it may be transmitted to a malicious third party which desires to wiretap the MST signal. This makes it difficult for the malicious third party to wiretap the MST signal.

Figure 9:
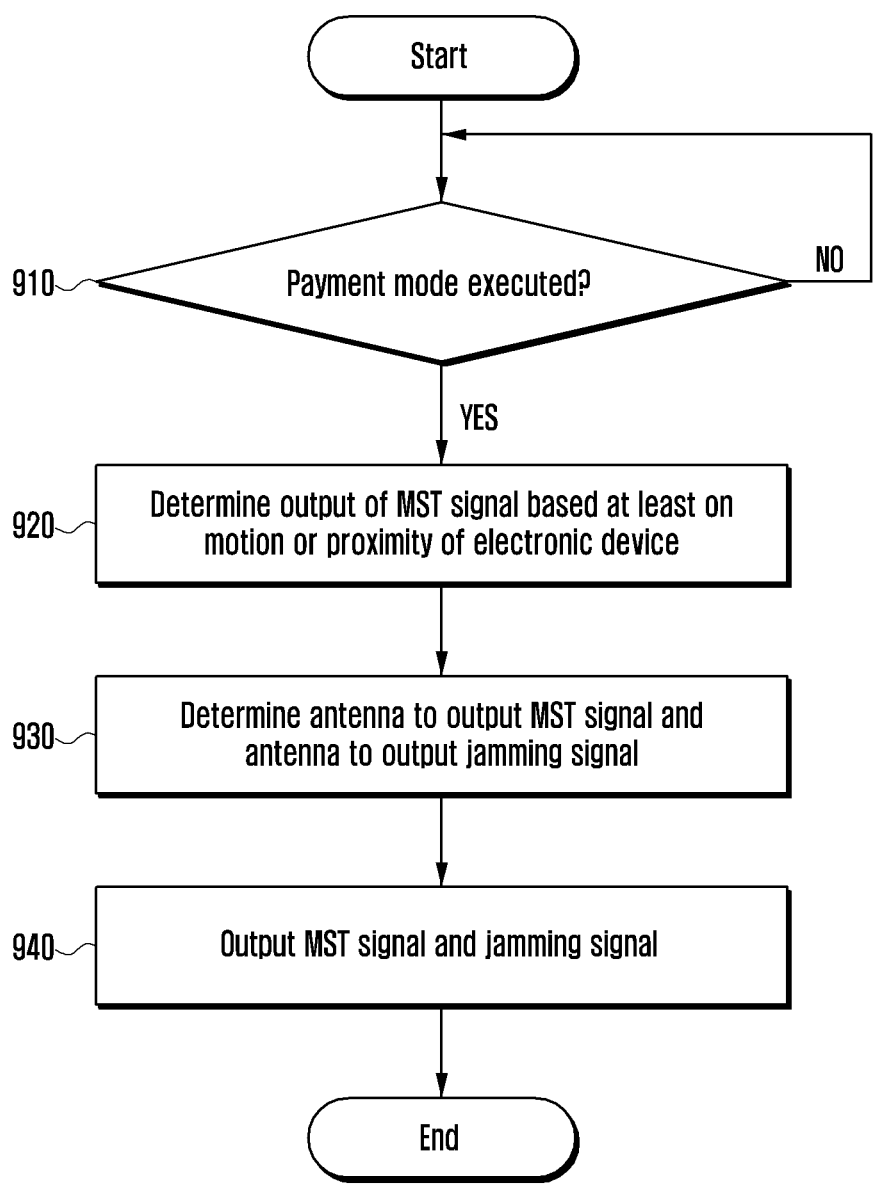
FIG. 9 is a flowchart illustrating an example operating method of an electronic device according to another example embodiment of the present disclosure.

FIG. 9 is a flowchart illustrating an example operating method of an electronic device according to another example embodiment of the present disclosure.

As illustrated in FIG. 9, the operating method of the electronic device according to another embodiment may include operations 910 to 940, which may be performed, for example, by the electronic device illustrated in FIG. 4. Each of operations 910 to 940 may be implemented, for example, with instructions that are executable by the processor (e.g., 410 in FIGS. 4 and 5) of the electronic device. These instructions may be stored, for example, in the memory of the electronic device.

At operation 910, the processor 410 may determine whether a payment mode is executed.

When the payment mode is executed, the processor 410 may determine output of the MST signal at operation 920, based at least on the motion or proximity of the electronic device.

According to various embodiments, the processor 410 may, for example, sense the motion of the electronic device through the acceleration sensor of the electronic device and, when the electronic device is stationary, may determine output of the MST signal.

According to various embodiments, the processor 410 may determine the proximity between the electronic device and the MST signal receiver through the infrared sensor of the electronic device and, if the proximity is equal to or greater than a predetermined value, may determine output of the MST signal.

When output of the MST signal is determined, the processor 410 may also determine at operation 930 an antenna to output the MST signal and another antenna to output the jamming signal for interfering with the wiretapping of the MST signal.

According to various example embodiments, the electronic device may include a first antenna disposed near a first surface of the electronic device to output a signal in a first direction and a second antenna disposed near a second surface, opposite to the first surface, to output a signal in a second direction opposite to the first direction. From among the first and second antennas, the processor 410 may determine an antenna to output the MST signal and another antenna to output the jamming signal, based on the posture of the electronic device.

The posture of the electronic device may be determined using the gyroscope sensor included in the electronic device.

According to various example embodiments, the processor 410 may determine a relative posture of the electronic device with respect to the MST signal receiver and then, based on the relative posture, determine a specific antenna for outputting the MST signal between the first and second antennas. For example, when it is determined that a distance between the first surface and the MST signal receiver is less than a distance between the second surface and the MST signal receiver, the processor 410 may determine the first antenna to output the MST signal and also determine the second antenna to output the jamming signal. On the other hand, if the distance between the first surface and the MST signal receiver is greater than the distance between the second surface and the MST signal receiver, the processor 410 may determine the second antenna to output the MST signal and also determine the first antenna to output the jamming signal.

At operation 940, the processor 410 may control one of the first and second antennas to output the MST signal and also control the other antenna to output the jamming signal.

According to various example embodiments of the present disclosure, method of operating an electronic device may include determining whether a payment mode is executed; determining an antenna for outputting a magnetic stripe transmission (MST) signal and another antenna for outputting a jamming signal for interfering with wiretapping of the MST signal from among first and second antennas when the payment mode is executed, wherein the first antenna is disposed between first and second surfaces of the electronic device and in parallel with the first and second surfaces of the electronic device, the first antenna configured to output a signal in a first direction, and wherein a second antenna is disposed between the second surface of the electronic device and the first antenna and in parallel with the first and second surfaces of the electronic device, the second antenna configured to output a signal in a second direction; and outputting the MST signal and the jamming signal by controlling the determined antennas.

The method according to various example embodiments may further include determining whether to output the MST signal, based on a motion or posture of the electronic device.

In the method according to various example embodiments, determining whether to output the MST signal may include determining a proximity between the electronic device and an MST signal receiver and determining whether to output the MST signal, based on the determined proximity.

In the method according to various example embodiments, determining the proximity may include determining the proximity between the electronic device and the MST signal receiver, based at least on data collected by an infrared sensor of the electronic device and whether there is a communication connection between the electronic device and the MST signal receiver.

In the method according to various example embodiments, determining whether to output the MST signal may include determining whether the electronic device is stationary, based on data collected by an acceleration sensor of the electronic device, and determining to output the MST signal when the electronic device is stationary.

The method according to various example embodiments may further include synchronizing the MST signal and the jamming signal such that the MST signal and the jamming signal are simultaneously output.

In the method according to various example embodiments, outputting the MST signal may include determining a relative posture of the electronic device with respect to an MST signal receiver; determining one of the first and second antennas for outputting the MST signal, based on the relative posture; and controlling the determined antenna to output the MST signal.

In the method according to various example embodiments, determining the antenna for outputting the MST signal may include determining the first antenna to output the MST signal and the second antenna to output the jamming signal when a distance between the first surface and the MST signal receiver is less than a distance between the second surface and the MST signal receiver and determining the second antenna to output the MST signal and the first antenna to output the jamming signal when a distance between the first surface and the MST signal receiver is greater than a distance between the second surface and the MST signal receiver.

The above-discussed method is described herein with reference to flowchart illustrations, methods, and computer program products according to example embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Certain example aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

The various example embodiments of the present disclosure as described above may involve the processing of input data and the generation of output data to some extent. This input data processing and output data generation may be implemented in hardware or software in combination with hardware. For example, specific electronic components may be employed in a mobile device or similar or related circuitry for implementing the functions associated with the various example embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a first antenna disposed between first and second surfaces of the electronic device and in parallel with the first and second surfaces of the electronic device, the first antenna configured to output a signal in a first direction;
   a second antenna disposed between the second surface of the electronic device and the first antenna and in parallel with the first and second surfaces of the electronic device, the second antenna configured to output a signal in a second direction;
   a magnetic stripe transmission (MST) integrated circuit (IC) configured to control the first and second antennas; and
   a processor configured to control, when a payment mode is executed, the MST IC such that one of the first and second antennas outputs an MST signal and the other one of the first and second antenna outputs a jamming signal for interfering with wiretapping of the MST signal.

2. The electronic device of claim 1, wherein the second antenna is disposed under a display of the electronic device, and wherein the first antenna is disposed nearer a particular one of surfaces of the electronic device than the second antenna, the particular surface being opposite to the display.

3. The electronic device of claim 1, wherein the processor is further configured to determine a proximity between the electronic device and an MST signal receiver and, based on the determined proximity, to determine whether to output the MST signal.

4. The electronic device of claim 3, wherein the processor is further configured to determine the proximity between the electronic device and the MST signal receiver, based at least on data of an infrared sensor of the electronic device and whether there is a communication connection between the electronic device and the MST signal receiver.

5. The electronic device of claim 1, wherein the processor is further configured to determine whether the electronic device is stationary, based on data of an acceleration sensor of the electronic device, and to determine whether to output the MST signal, based on whether the electronic device is stationary.

6. The electronic device of claim 1, further comprising:
at least one shielding film disposed between the first and second antennas.

7. The electronic device of claim 1, wherein the processor is further configured to synchronize the MST signal and the jamming signal to output the MST signal and the jamming signal simultaneously.

8. The electronic device of claim 1, wherein the processor is further configured to determine a relative posture of the electronic device with respect to an MST signal receiver, and to determine one antenna of the first and second antenna for outputting the MST signal.

9. The electronic device of claim 8, wherein the processor is further configured to control the first antenna to output the MST signal and to control the second antenna to output the jamming signal when a distance between the first surface and the MST signal receiver is less than a distance between the second surface and the MST signal receiver.

10. The electronic device of claim 8, wherein the processor is further configured to control the second antenna to output the MST signal and to control the first antenna to output the jamming signal when a distance between the first surface and the MST signal receiver is greater than a distance between the second surface and the MST signal receiver.

11. The electronic device of claim 1, wherein the processor is further configured to control output strength of the jamming signal based on output strength of the MST signal.

12. An electronic device comprising:
a first antenna disposed between first and second surfaces of the electronic device and in parallel with the first and second surfaces of the electronic device, the first antenna configured to output a signal in a first direction;
a second antenna disposed between the second surface of the electronic device and the first antenna and in parallel with the first and second surfaces of the electronic device, the second antenna configured to output a signal in a second direction;
a magnetic stripe transmission (MST) integrated circuit (IC) configured to control the first and second antennas; and
a processor configured to control the MST IC,
wherein the processor is configured to:
determine whether to output an MST signal when a payment mode is executed, based on a motion of the electronic device,
determine one of the first and second antenna for outputting the MST signal and the other of the first and second antenna for outputting a jamming signal for interfering with wiretapping of the MST signal, based on a posture of the electronic device, and
control the MST IC to output the jamming signal in response to output of the MST signal.

13. A method of operating an electronic device, comprising:
determining whether a payment mode is executed;
determining an antenna for outputting a magnetic stripe transmission (MST) signal and another antenna for outputting a jamming signal for interfering with wiretapping of the MST signal from among first and second antennas when the payment mode is executed, wherein the first antenna is disposed between first and second surfaces of the electronic device and in parallel with the first and second surfaces of the electronic device, the first antenna configured to output a signal in a first direction, and wherein a second antenna is disposed between the second surface of the electronic device and the first antenna and in parallel with the first and second surfaces of the electronic device, the second antenna configured to output a signal in a second direction; and
outputting the MST signal and the jamming signal by controlling the determined antennas.

14. The method of claim 13, further comprising:
determining whether to output the MST signal, based on a motion or posture of the electronic device.

15. The method of claim 14, wherein determining whether to output the MST signal includes:
determining a proximity between the electronic device and an MST signal receiver; and
determining whether to output the MST signal, based on the determined proximity.

16. The method of claim 15, wherein identifying the proximity includes determining the proximity between the electronic device and the MST signal receiver, based at least on data of an infrared sensor of the electronic device and whether there is a communication connection between the electronic device and the MST signal receiver.

17. The method of claim 14, wherein determining whether to output the MST signal includes:
determining whether the electronic device is stationary, based on data of an acceleration sensor of the electronic device; and
determining to output the MST signal when the electronic device is stationary.

18. The method of claim 13, further comprising:
synchronizing the MST signal and the jamming signal to simultaneously output the MST signal and the jamming signal.

19. The method of claim 13, wherein outputting the MST signal includes:
determining a relative posture of the electronic device with respect to an MST signal receiver;
determining one of the first and second antenna for outputting the MST signal, based on the relative posture; and
controlling the determined antenna to output the MST signal.

20. The method of claim 19, wherein determining one of the first and second antenna for outputting the MST signal includes:
determining the first antenna to output the MST signal and the second antenna to output the jamming signal when a distance between the first surface and the MST signal receiver is less than a distance between the second surface and the MST signal receiver; and
determining the second antenna to output the MST signal and the first antenna to output the jamming signal when a distance between the first surface and the MST signal receiver is greater than a distance between the second surface and the MST signal receiver.

* * * * *